Sept. 28, 1926.  
C. C. FARMER  
VENT VALVE DEVICE  
Filed Nov. 27, 1925
1,601,167
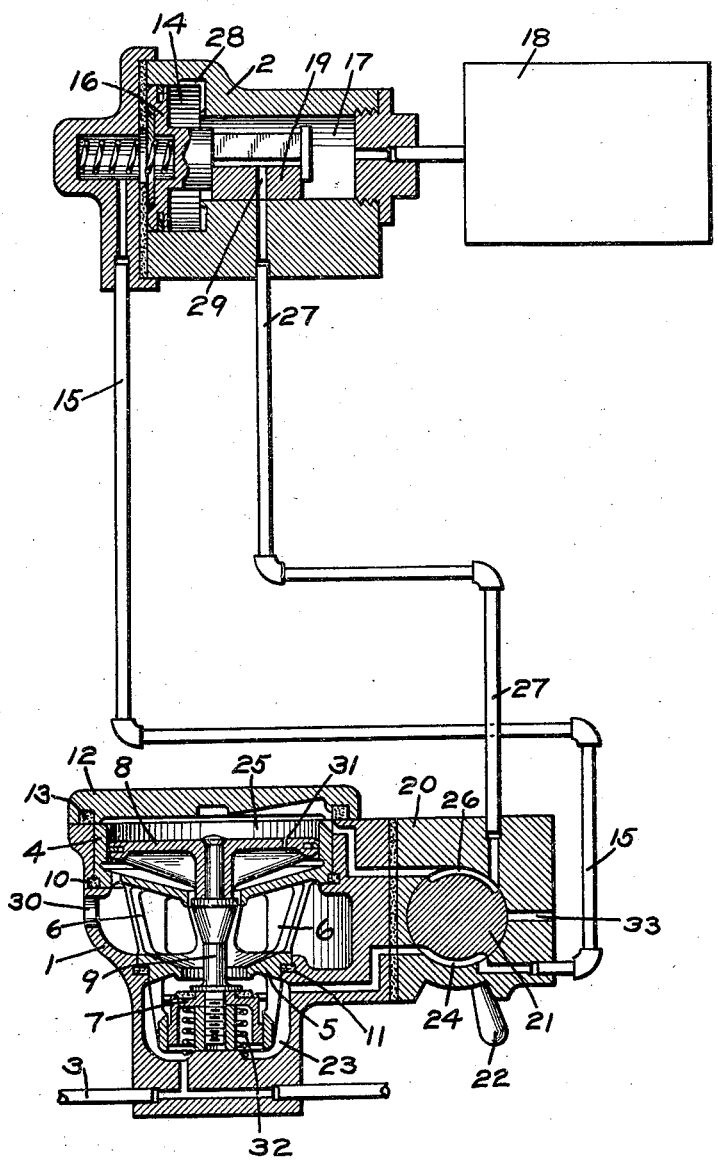
INVENTOR  
CLYDE C. FARMER  
BY *Wm. M. Cady*  
ATTORNEY Patented Sept. 28, 1926.

1,601,167

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

VENT-VALVE DEVICE.

Application filed November 27, 1925. Serial No. 71,531.

This invention relates to vent valve devices of the type employed in connection with fluid pressure brake systems for effecting a local reduction in brake pipe pressure in an emergency application of the brakes.

One object of my invention is to provide an improved vent valve structure.

Another object of my invention is to provide means for preventing accidental operation of a vent valve device.

In the accompanying drawing, the single figure is a diagrammatic view, in section, of a portion of a fluid pressure brake apparatus, including a vent valve device and embodying my invention.

The apparatus shown in the drawing comprises a vent valve device 1, an emergency valve device 2, and a brake pipe 3.

The vent valve device 1 comprises a casing having a chamber in which is mounted a vent valve holding cage. Said cage comprises a bushing portion 4 and a valve holding portion 5 united by webbing 6. A vent valve 7 is mounted to reciprocate in a bore of the valve portion 5 and is adapted to engage a seat provided in the valve portion. A piston 8 is mounted to reciprocate in a bore of the bushing portion 4 and is connected to the valve 7 by a stem 9.

The bushing portion 4 seats on an annular ledge of the valve casing with a gasket ring 10 interposed to make a tight joint. The valve portion 5 also seats on an annular ledge of the casing, a gasket ring 11 being interposed between the ledge and the valve portion. A cap plate 12 provided with a gasket ring 13 closes the piston end of the valve casing.

The emergency valve device 2 comprises a casing having a piston chamber 14 connected to pipe 15 and containing a piston 16 and a valve chamber 17, connected to reservoir 18 and containing a slide valve 19 adapted to be operated by piston 16.

Associated with the vent valve device 1 is a cut-out cock casing 20, containing a rotary cock 21 adapted to be operated by a handle 22. In the open position of the cock 21, valve chamber 23 of the vent valve device is connected through a cavity 24 with pipe 15 and piston chamber 25 is connected through cavity 26 with a pipe 27 which leads to the seat of slide valve 19.

In operation, when the brake pipe 3 is charged with fluid under pressure, fluid flows through pipe 15 to piston chamber 14 and shifts the piston 16 to its inner position, in which fluid is supplied from piston chamber 14 through feed groove 28 to valve chamber 17 and the reservoir 18. The pipe 27 is blanked in this position of slide valve 19 and vent valve 7 will be seated, with piston 8 in its upper position.

Upon a sudden reduction in brake pipe pressure, the piston 16 is shifted to its outer position, as shown in the drawing, so that port 29 in slide valve 19 registers with pipe 27. Fluid under pressure from the reservoir 18 then flows through pipe 27 and cavity 26 of the cut-out cock 21 to piston chamber 25 and piston 8 is thereupon shifted, so as to open the vent valve 7 and thus permit fluid under pressure to be locally vented from the brake pipe 3 to atmospheric exhaust port 30. The piston 8 is provided with a restricted port 31, through which fluid from piston chamber 25 and the reservoir 18 is vented to the atmosphere by way of port 30. When the pressure above the piston 8 has been reduced to a predetermined degree, the spring 32 returns the valve 7 to its seated position, cutting off the further venting of fluid from the brake pipe.

The vent valve device may be cut out of action by turning the cut-out cock 21 to a position in which communication from piston chamber 25 to pipe 27 is cut off and also from brake pipe 3 to pipe 15. With pipe 27 cut off from piston chamber 25, there is a possibility of leakage from reservoir 18 past the slide valve 19 to pipe 27, and if pipe 27 should thus be charged with fluid under pressure, then when the cock 21 is turned to its open position, it is possible that the fluid pressure in pipe 27 may be sufficient to cause the operation of piston 8 and the opening of vent valve 7 when not desired. In order to obviate this difficulty, an exhaust port 33 is provided, in casing 20, so that when the cut-out cock 21 is turned to the cut out position, the pipe 27 will be connected to said exhaust port through cavity 26.

Having now described my invention, what I claim as new and desire to secure by Letters Patent, is:

1. The combination with a brake pipe, a brake pipe vent valve device, an emergency valve device operated upon a reduction in brake pipe pressure for supplying fluid under pressure to operate said vent valve device, of a cut-out cock having a position for cutting off communication through a passageway through which fluid under pressure is supplied to said vent valve device and in which position the emergency valve device side of the passageway is connected to the atmosphere.

2. A brake pipe vent valve device comprising a casing, a cage mounted in said casing and having a piston bushing portion and a valve portion integrally connected to said piston bushing portion, a vent valve mounted and having a seat in said valve portion, a piston mounted in said piston bushing portion, and a stem connecting said piston to said valve.

3. A brake pipe vent valve device comprising a casing a cage mounted in said casing and having a piston bushing portion, a vent valve portion, and sections integrally connecting said bushing portion to said valve portion, a gasket ring interposed between said bushing portion and the casing, a gasket ring interposed between said valve portion and the casing, a vent valve mounted in said valve portion, a piston mounted in said bushing portion, and a stem connecting said piston to said valve.

In testimony whereof I have hereunto set my hand.

CLYDE C. FARMER.